US011185814B2

(12) United States Patent
Matsuoka et al.

(10) Patent No.: US 11,185,814 B2
(45) Date of Patent: Nov. 30, 2021

(54) ABSORPTION AGENT, METHOD OF MANUFACTURING SAME, AND METHOD FOR SEPARATION AND RECOVERY OF ACIDIC COMPOUND

(71) Applicants: KOBE STEEL, LTD., Kobe (JP); NATIONAL UNIVERSITY CORPORATION NAGOYA UNIVERSITY, Nagoya (JP)

(72) Inventors: Akira Matsuoka, Kobe (JP); Akira Kishimoto, Kobe (JP); Hiroshi Machida, Aichi (JP); Hirotoshi Horizoe, Aichi (JP)

(73) Assignees: KOBE STEEL, LTD., Kobe (JP); NATIONAL UNIVERSITY CORPORATION NAGOYA UNIVERSITY, Nagoya (JP)

( * ) Notice: Subject to any disclaimer, the term of this patent is extended or adjusted under 35 U.S.C. 154(b) by 147 days.

(21) Appl. No.: 16/064,862

(22) PCT Filed: Dec. 13, 2016

(86) PCT No.: PCT/JP2016/086963
§ 371 (c)(1),
(2) Date: Jun. 21, 2018

(87) PCT Pub. No.: WO2017/110569
PCT Pub. Date: Jun. 29, 2017

(65) Prior Publication Data
US 2019/0001259 A1  Jan. 3, 2019

(30) Foreign Application Priority Data

Dec. 22, 2015 (JP) .............................. JP2015-249603

(51) Int. Cl.
*B01D 53/14* (2006.01)
*B01D 53/52* (2006.01)
(Continued)

(52) U.S. Cl.
CPC ......... *B01D 53/1493* (2013.01); *B01D 53/14* (2013.01); *B01D 53/1418* (2013.01);
(Continued)

(58) Field of Classification Search
USPC ....................................................... 423/228
See application file for complete search history.

(56) References Cited

U.S. PATENT DOCUMENTS 2,600,328 A   6/1952  Riesenfeld et al.
4,137,294 A * 1/1979  Braizler ............ B01D 53/1493
                                                     423/223
(Continued)

FOREIGN PATENT DOCUMENTS

JP   2006-136885 A   6/2006
JP   2010-194378 A   9/2010
(Continued)

OTHER PUBLICATIONS

Huntsman Corporation, "Comparative Solvents Data", 1989. (Year: 1989).*
(Continued)

*Primary Examiner* — Anita Nassiri-Motlagh
(74) *Attorney, Agent, or Firm* — Oblon, McClelland, Maier & Neustadt, L.L.P.

(57) ABSTRACT

The absorption agent of the present invention contains water, an amine compound, and an organic solvent, and a value obtained by subtracting a solubility parameter of the organic solvent from a solubility parameter of the amine compound is 1.1 $(cal/cm^3)^{1/2}$ or more and 4.2 $(cal/cm^3)^{1/2}$ or less. The method for separation and recovery of an acidic
(Continued)

compound of the present invention includes the steps of: bringing a mixed gas containing an acidic compound into contact with an absorption agent containing water, an amine compound, and an organic solvent to absorb the acidic compound into the absorption agent; causing the absorption agent that has absorbed the acidic compound to be phase-separated into a first phase containing the acidic compound in a high content and a second phase containing the acidic compound in a low content; and heating the first phase to release the acidic compound from the first phase.

20 Claims, 1 Drawing Sheet

(51) Int. Cl.
  $B01D\ 53/62$ (2006.01)
  $B01D\ 53/78$ (2006.01)
  $C10L\ 3/10$ (2006.01)
(52) U.S. Cl.
  CPC ..... *B01D 53/1425* (2013.01); *B01D 53/1468* (2013.01); *B01D 53/1475* (2013.01); *B01D 53/52* (2013.01); *B01D 53/62* (2013.01); *B01D 53/78* (2013.01); *B01D 2252/202* (2013.01); *B01D 2252/2025* (2013.01); *B01D 2252/2026* (2013.01); *B01D 2252/2041* (2013.01); *B01D 2252/20426* (2013.01); *B01D 2252/20478* (2013.01); *B01D 2252/20489* (2013.01); *B01D 2252/504* (2013.01); *B01D 2257/304* (2013.01); *B01D 2257/504* (2013.01); *B01D 2258/0283* (2013.01); *C10L 3/10* (2013.01)

(56) References Cited

U.S. PATENT DOCUMENTS

| | | |
|---|---|---|
| 2006/0104877 A1 | 5/2006 | Cadours et al. |
| 2009/0263302 A1 | 10/2009 | Hu |
| 2010/0319540 A1 | 12/2010 | Garcia Andarcia et al. |
| 2011/0052458 A1* | 3/2011 | Hu ................. B01D 53/1425 422/223 |
| 2012/0080644 A1 | 4/2012 | Seiler et al. |
| 2014/0178279 A1 | 6/2014 | Svendsen et al. |

FOREIGN PATENT DOCUMENTS

| | | |
|---|---|---|
| JP | 2012-528709 A | 11/2012 |
| JP | 2013-13854 A | 1/2013 |
| JP | 2014-36933 A | 2/2014 |

OTHER PUBLICATIONS

Extended European Search Report dated Jun. 3, 2019 in Patent Application No. 16878460.1, 7 pages.
International Search Report dated Mar. 7, 2017, in PCT/JP2016/086963 filed Dec. 13, 2016.

* cited by examiner

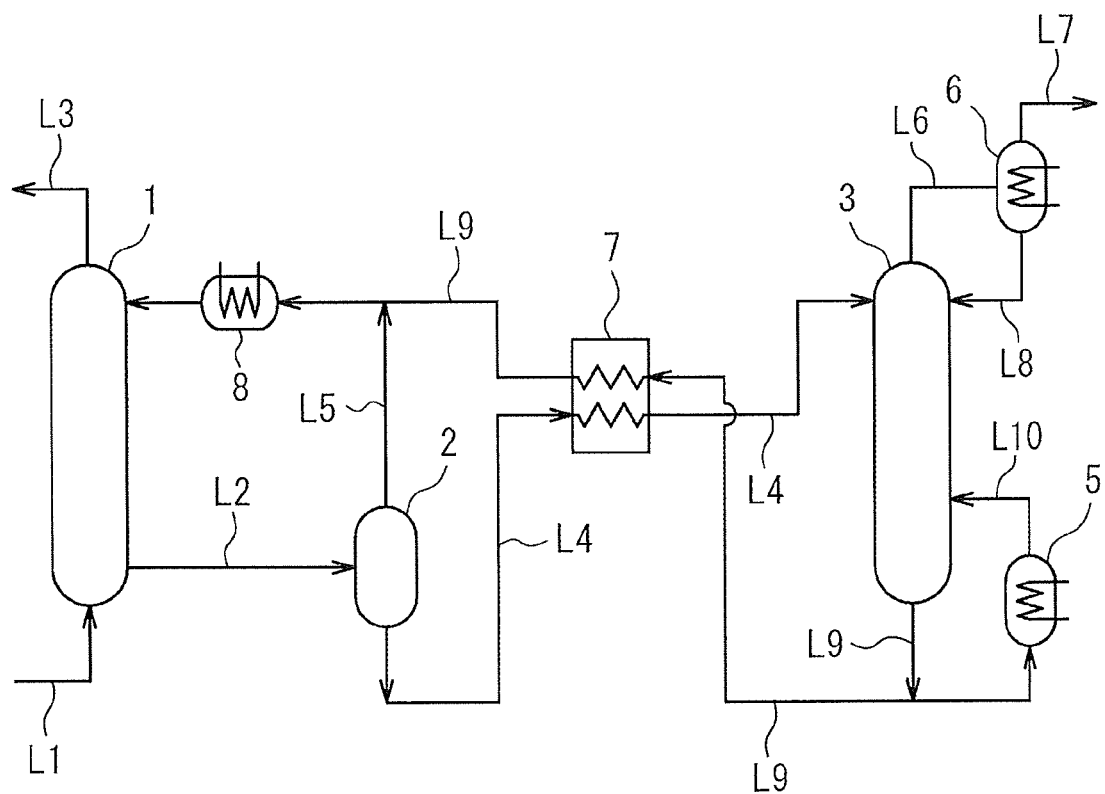

ABSORPTION AGENT, METHOD OF MANUFACTURING SAME, AND METHOD FOR SEPARATION AND RECOVERY OF ACIDIC COMPOUND

TECHNICAL FIELD

The present invention relates to an absorption agent, a method of manufacturing the same, and a method for separation and recovery of an acidic compound.

BACKGROUND ART

Mixed gases containing acidic compounds are discharged from boilers in thermal power plants and steel works or kilns in cement plants. Owing to environmental issues such as global warming, a technique for separation and recovery of only acidic compounds from a mixed gas containing the acidic compounds has been required. The acidic compounds refer to compounds capable of generating an acid when dissolved in water. Specific examples of the acidic compounds may include carbon dioxide, hydrogen sulfide, sulfur disulfide, and the like. A method for recovering acidic compounds from a mixed gas containing the acidic compounds may include a method using an alkaline absorption agent. According to the method described above, first, a mixed gas is brought into contact with an absorption agent to absorb an acidic compound into the absorption agent. Next, the absorption agent that has absorbed the acidic compound is heated to desorb the acidic compound from the absorption agent. Then, the acidic compound that has desorbed from the absorption agent is recovered.

Patent Literature 1 proposes an absorption agent containing water, a tertiary amine, and an organic solvent, as one example of the absorption agents described above. The absorption agent described in Patent Literature 1 is suitable for separation and recovery of carbon dioxide contained in the mixed gas at a comparatively high partial pressure. When the absorption agent described in Patent Literature 1 is applied to a mixed gas in which carbon dioxide is contained at a low partial pressure, however, an energy for desorption of carbon dioxide from the absorption agent by heating relatively increases. Recently, an interest in global environment has been increased, and accordingly an absorption agent capable of separating acidic compounds by less energy is required.

In order to decrease the energy for separation of acidic compounds from an absorption agent, for example, Patent Literature 2 proposes an absorption agent causing phase separation of a first phase containing acidic compounds in a low content and a second phase containing acidic compounds in a high content.

According to the gas deoxidation method described in Patent Literature 2, only the second phase containing acidic compounds in a high content is heated to eliminate the acidic compounds from the second phase. As described above, when the absorption agent separates into two phases, it is possible to decrease an absolute quantity of the absorption agent to be heated, so that it is possible to decrease the energy necessary for regeneration of the absorption agent.

Patent Literature 2 discloses diverse materials such as water, an alcoholic solvent, and an alkali salt as components forming the absorption agent. It is very difficult to decide various components and blending amounts of the components from the materials described above so that the absorption agent can exhibit the nature of absorbing the acidic compounds and causes phase separation after the acidic compounds are absorbed. Patent Literature 2, however, does not describe any guiding principle for deciding the components forming the absorption agent or the blending ratios of the components.

CITATION LIST

Patent Literature

Patent Literature 1: JP-2014-36933-A
Patent Literature 2: JP-2006-136885-A

SUMMARY OF INVENTION

The present invention aims at providing an absorption agent that absorbs an acidic compound contained in a mixed gas, and causes phase separation after the absorption agent absorbs the acidic compound; a method of manufacturing the same, and a method for separation and recovery of an acidic compound.

An absorption agent according to the present invention contains water, an amine compound, and an organic solvent, in which a value obtained by subtracting a solubility parameter of the organic solvent from a solubility parameter of the amine compound is 1.1 $(cal/cm^3)^{1/2}$ or more and 4.2 $(cal/cm^3)^{1/2}$ or less.

A method of manufacturing an absorption agent according to the present invention includes the steps of: mixing water, an amine compound, and organic solvent; and, before the mixing step described above, selecting the amine compound and the organic solvent so that a value obtained by subtracting a solubility parameter of the organic solvent from a solubility parameter of the amine compound is 1.1 $(cal/cm^3)^{1/2}$ or more and 4.2 $(cal/cm^3)^{1/2}$ or less.

A method for separation and recovery of an acidic compound according to the present invention includes the steps of: bringing a mixed gas containing an acidic compound into contact with an absorption agent containing water, an amine compound, and an organic solvent to absorb the acidic compound into the absorption agent; causing the absorption agent that has absorbed the acidic compound to be phase-separated into a first phase containing the acidic compound in a high content and a second phase containing the acidic compound in a low content; and heating the first phase to release the acidic compound from the first phase, in which a value obtained by subtracting a solubility parameter of the organic solvent from a solubility parameter of the amine compound is 1.1 $(cal/cm^3)^{1/2}$ or more and 4.2 $(cal/cm^3)^{1/2}$ or less.

The term "solubility parameter" herein refers to a solubility parameter calculated according to Fedors method.

BRIEF DESCRIPTION OF DRAWING

FIG. 1 is a schematic view showing an apparatus for separation and recovery of an acidic compound using an absorption agent according to one embodiment of the present invention.

DESCRIPTION OF EMBODIMENTS

[Absorption Agent]
An absorption agent according to the present invention has the nature of absorbing an acidic compound and the nature of releasing the acidic compound absorbed, and contains water, an amine compound, and an organic solvent.

A value obtained by subtracting a solubility parameter of the organic solvent from a solubility parameter of the amine compound (hereinafter this value is referred to as a "difference in solubility parameter") is 1.1 $(cal/cm^3)^{1/2}$ or more, preferably 1.2 $(cal/cm^3)^{1/2}$ or more. On the other hand, the difference in solubility parameter is 4.2 $(cal/cm^3)^{1/2}$ or less, preferably 4.0 $(cal/cm^3)^{1/2}$ or less. When the difference in solubility parameter is adjusted to the range described above, it is possible to obtain an absorption agent in the state of a single liquid phase in which the phase separation is not caused before the absorption agent absorbs the acidic compound. When the absorption agent is in the state of a single liquid phase, it is possible to bring the mixed gas containing the acidic compound into uniform contact with the absorption agent, so that the acidic compound contained in the mixed gas can be effectively absorbed into the absorption agent.

Moreover, when the difference in solubility parameter is adjusted to the range described above, the absorption agent is phase-separated into a phase (first phase) containing the acidic compound in a high content and a phase (second phase) containing the acidic compound in a low content after the absorption agent absorbs the acidic compound. When the first phase, which has been phase-separated as described above, is subjected to a treatment for eliminating the acidic compound, it is possible to recover the acidic compound that have been absorbed in the absorption agent. That is, using the absorption agent of the present invention, it is not required to subject the whole absorption agent to the treatment for eliminating the acidic compound, as required in conventional absorption agents, but only the first phase in the absorption agent is subjected to the treatment for eliminating the acidic compound. For this reason, when the absorption agent of the present invention is used, it is possible to eliminate the acidic compound at a lower energy than in conventional processes.

When the difference in solubility parameter is 1.1 $(cal/cm^3)^{1/2}$ or more, the absorption agent that has absorbed the acidic compound is easily phase-separated; whereas when the difference in solubility parameter is 4.2 $(cal/cm^3)^{1/2}$ or less, it is possible to prevent the phase separation of the absorption agent before the absorption agent absorbs the acidic compound. As described above, the absorption efficiency of the acidic compound by the absorption agent can be increased by bringing the absorption agent in the state of a single phase into uniform contact with the mixed gas.

(Amine Compound)

As an amine compound, it is possible to use one or more amines selected from the group consisting of primary amines, secondary amines, and tertiary amine, and it is preferable to use alkanolamines. Alkanolamine contains an amino group and a hydroxyl group in its molecule, and thus has high compatibility with water, and can effectively absorb the acidic compound. When the absorption agent contains multiple kinds of amine compounds, a volume average value of the solubility parameters of the amine compounds is defined as a solubility parameter of the amine compound.

Examples of the primary amine may include 1,3-diaminopropane (DAP), 2-aminoethanol (MEA), DL-2-amino-1-propanol (AP), 2-(2-aminoethoxy)ethanol (AEE), (R)-4-amino-2-methyl-1-butanol (AMB), and the like. Examples of the secondary amine may include 2-(methylamino)ethanol (MAE), 2-(ethylamino)ethanol (EAE), 2-(butylamino)ethanol (BAE), and the like. Examples of the tertiary amine may include triethanolamine (TEA), N-methyldiethanolamine (MDEA), tetramethyletylenediamine (TEMED), pentamethyldiethylenetriamine (PMDETA), hexamethyltriethylenetetramine, bis(2-dimethylaminoethyl)ether, and the like. Examples of the alkanolamine may include 2-aminoethanol (MEA), DL-2-amino-1-propanol (AP), 2-(2-aminoethoxy)ethanol (AEE), (R)-4-amino-2-methyl-1-butanol (AMB), 2-(methylamino)ethanol (MAE), 2-(ethylamino)ethanol (EAE), 2-(butylamino)ethanol (BAE), and the like.

The amine compound has a solubility parameter of preferably 10 $(cal/cm^3)^{1/2}$ or more, more preferably 12 $(cal/cm^3)^{1/2}$ or more. On the other hand, the amine compound has a solubility parameter of preferably 20 $(cal/cm^3)^{1/2}$ or less, more preferably 15 $(cal/cm^3)^{1/2}$ or less. When the amine compound has a solubility parameter of 10 $(cal/cm^3)^{1/2}$ or more, the absorption agent is not phase-separated before the absorption agent absorbs the acidic compound, and thus the absorption agent can efficiently absorb the acidic compound. When the amine compound has a solubility parameter of 20 $(cal/cm^3)^{1/2}$ or less, the absorption agent is phase-separated after the absorption agent absorbs the acidic compound, and thus only the first phase containing a large amount of the acidic compound obtained after the phase-separation is heated, so that the acidic compound can be efficiently recovered.

The absorption agent preferably contains the secondary amine. The secondary amine more easily causes a bicarbonate reaction in which one amine molecule absorbs one carbon dioxide molecule than a carbamate reaction in which two amine molecules absorb one carbon dioxide molecule. The secondary amine, therefore, has an absorption amount of carbon dioxide per mole larger than that of the primary amine. Furthermore, the bicarbonate reaction has a heat of reaction lower than that of the carbamate reaction, and thus energy necessary for absorption and elimination of the acidic compound can be suppressed by using the secondary amine. In addition, when the absorption agent contains the secondary amine, the acidic compound can be easily absorbed, even if the partial pressure of the acidic compound is low in the mixed gas.

As the amine compound, the primary amine may be added to the secondary amine in an amount of 3% by mass or more and 10% by mass or less. When such an amine compound is used, it is possible to increase the absorption speed of the acidic compound by the secondary amine. In addition, as the amine compound, the tertiary amine may be added to the secondary amine in an amount of 3% by mass or more and 10% by mass or less. It is more preferable that the absorption agent contains alkanolamine. When the amine compound containing an amino group and a hydroxyl group, such as alkanolamine, is used, it is possible to obtain an absorption agent having excellent compatibility with water and high absorption performance of the acidic compound.

The tertiary amine causes only a bicarbonate reaction, and thus an absorption amount of carbon dioxide per unit quantity can be increased. On the other hand, the tertiary amine has low absorption efficiency of carbon dioxide in a low pressure, and thus it is difficult for the absorption agent to absorb carbon dioxide, when the partial pressure of carbon dioxide is comparatively low.

The absorption agent contains preferably 20% by mass or more of the amine compound, more preferably 25% by mass or more of the amine compound. On the other hand, the absorption agent contains preferably 40% by mass or less of the amine compound, more preferably 35% by mass or less of the amine compound. When the amine compound is contained in an amount of 20% by mass or more, the ability of absorbing the acidic compound can be increased. Further, when the amine compound is contained in an amount of 40% by mass or less, the volume ratio of the first phase is decreased after the phase separation, so that the amount of the absorption agent to be heated can be decreased. Accordingly, energy necessary for releasing the acidic compound from the absorption agent can be reduced.

(Organic Solvent)

As an organic solvent, a solvent having a difference in solubility parameter with the amine compound within the range described above is selected. It is preferable that the organic solvent contains either an alcohol having 2 to 15 carbon atoms or an ether having 4 to 20 carbon atoms, more preferably either an alcohol having 3 to 10 carbon atoms or an ether having 4 to 12 carbon atoms.

The organic solvent is preferably an alcohol in which hydrogen contained in a linear hydrocarbon having 3 to 8 carbon atoms is substituted with a hydroxyl group. Such an alcohol can secure hydrophilicity by the hydroxyl group and can secure lipophilicity by the linear hydrocarbon having 3 to 8 carbon atoms. An absorption agent that is not phase-separated before the absorption agent absorbs an acidic compound and that is phase-separated after the absorption agent absorbs the acidic compound can be prepared by combining the hydrophilic group with the lipophilic group. Specific examples of such an alcohol may include 1-butanol, 1-pentanol, octanol, and the like.

The organic solvent has an ether bond, preferably contains an linear ether having 4 to 20 carbon atoms, and the solvent is preferably a linear ether having 2 or more and 4 or less ether bonds and having 6 to 10 carbon atoms. Such a linear ether has high hydrophilicity, and the absorption agent is easily phase-separated into two phases after the absorption agent absorbs the acidic compound. Specific examples of the ether may include diethyleneglycol diethyl ether (DEGDEE), diethyleneglycol dimethyl ether (DEGDME), and the like.

The organic solvent has a solubility parameter of preferably 6 $(cal/cm^3)^{1/2}$ or more, more preferably 8 $(cal/cm^3)^{1/2}$ or more. On the other hand, the organic solvent has a solubility parameter of preferably 13 $(cal/cm^3)^{1/2}$ or less, more preferably 12 $(cal/cm^3)^{1/2}$ or less, even more preferably 11 $(cal/cm^3)^{1/2}$ or less. When the organic solvent has a solubility parameter of 6 $(cal/cm^3)^{1/2}$ or more, it is difficult for the absorption agent to be phase-separated before the acidic compound is absorbed, and thus the absorption agent can efficiently absorb the acidic compound. When the organic solvent has a solubility parameter of 13 $(cal/cm^3)^{1/2}$ or less, the absorption agent can be easily phase-separated into two phases after the acidic compound is absorbed, and thus the acidic compound can be efficiently recovered.

The organic solvent may be a single compound or a mixture of multiple kinds of compounds. When multiple kinds of the organic solvents are used, a volume average value of the solubility parameters of the organic solvents is defined as the solubility parameter of the organic solvent.

The organic solvent is contained in an amount of preferably 40% by mass or more, more preferably 45% by mass or more. On the other hand, the organic solvent is contained in an amount of 60% by mass or less, more preferably 55% by mass or less. When the organic solvent is contained in an amount of 40% by mass or more, the phase separation caused by the absorption of the acidic compound can be promoted. Further, when the organic solvent is contained in an amount of 60% by mass or less in the absorption agent, the ability of absorbing the acidic compound can be increased.

The absorption agent may appropriately contain additives such as an absorption promoter, an antioxidant, and a corrosion inhibitor. As the absorption promoter, for example, piperazine may be used.

<Method of Manufacturing Absorption Agent>

A method of manufacturing an absorption agent according to the present invention includes the steps of: mixing water, an amine compound, and organic solvent; and, before the mixing step described above, selecting the amine compound and the organic solvent so that the amine compound and the organic solvent satisfy the difference in solubility parameter described above.

When the amine compound and the organic solvent are selected with focusing on the difference in solubility parameter as described above, an absorption agent can be manufactured which is in the state of a single liquid phase before the absorption agent absorbs an acidic compound and which is phase-separated after absorption agent absorbs an acidic compound.

[Method for Separation and Recovery of Acidic Compound]

A method for separation and recovery of an acidic compound according to the present invention is performed using, for example, a recovery apparatus shown in FIG. 1. The recovery method includes the steps of: bringing a mixed gas containing an acidic compound into contact with an absorption agent containing water, an amine compound, and an organic solvent to absorb the acidic compound into the absorption agent; causing the absorption agent that has absorbed the acidic compound to be phase-separated into a first phase containing the acidic compound in a high content and a second phase containing the acidic compound in a low content; and heating the first phase to release the acidic compound from the first phase. The recovery apparatus shown in FIG. 1 will be explained below.

The recovery apparatus shown in FIG. 1 is provided with an absorber 1, a liquid separator 2, a regenerator 3, a reboiler 5, a condenser 6, a main heat exchanger 7, and a cooler 8. The parts are connected through pipes L1 to L10 to the others. An absorption agent in the absorber 1 is circulated to the absorber 1 with passing through the liquid separator 2 and the regenerator 3 through the pipes L2, L4 and L9 among the pipes L1 to L10.

The absorber 1 is a part in which an absorption agent absorbs an acidic compound in a mixed gas (gas to be treated). The mixed gas that is introduced into the absorber 1 through the pipe L1 is brought into contact with the absorption agent, so that the acidic compound in the mixed gas is absorbed into the absorption agent. The absorption agent that has absorbed the acidic compound in the absorber 1 is fed to the liquid separator 2 through the pipe L2. The mixed gas, from which the acidic compound is removed, is discharged outside the system through the pipe L3. The absorption of the acidic compounds in the absorber 1 is an exothermic reaction.

The absorber 1 described above may be an apparatus capable of continuously bringing the mixed gas into contact with the absorption agent. As a method of bringing the mixed gas into contact with the absorption agent, for example, the absorption agent may be sprayed onto a passage of the mixed gas; the absorption agent may be flowed down through a filler placed in the passage of the mixed gas; or each of the mixed gas and the absorption agent is introduced into a large number of fine passages and the fine passages for the mixed gas and the fine passages for the absorption agent may be joined together.

The liquid separator 2 is a part in which the absorption agent that has absorbed the acidic compound is caused to be phase-separated. The absorption agent is caused to be phase-separated into a first phase containing the acidic compound in a high content and a second phase containing the acidic compound in a low content in the liquid separator 2. As the liquid separator 2, for example, a vessel capable of specific gravity-separation of the absorption agent or an apparatus of separating the absorption agent by centrifugation is used. The first phase that is separated in the liquid separator 2 is fed to the regenerator 3 from the pipe L4 through the main heat exchanger 7. The second phase that is separated in the liquid separator 2 is returned to the absorber 1 from the pipe L5 through the cooler 8.

The regenerator 3 is a part in which the acidic compound is eliminated (released) from the first phase separated in the liquid separator 2. The first phase that is supplied to the regenerator 3 is heated by the reboiler 5, so that the acidic compound is eliminated from the first phase. At the same time, water that is contained in the first phase is evaporated by heating with the reboiler 5 to form steam. The elimination of the acidic compound from the first phase is an endothermic reaction. The heat from the reboiler 5 is supplied to the regenerator 3 through the pipe L10. The acidic compound that is eliminated from the first phase is fed to the condenser 6 through the pipe L6 together with the steam. On the other hand, the first phase from which the acidic compound is eliminated is fed to the cooler 8 through the pipe L9.

The condenser 6 is a part in which the acidic compound and the steam, both of which are generated by the heat from the reboiler 5, are separated. A mixed gas of the acidic compound and the steam is cooled in the condenser 6, so that the steam in the mixed gas is condensed into water. The resulting water is refluxed to the regenerator 3 through the pipe L8. On the other hand, the acidic compound in the mixed gas is passed through the pipe L7 and recovered outside the system.

The main heat exchanger 7 is a part in which heat exchange is performed between the first phase that is fed from the liquid separator 2 to the regenerator 3 and the first phase that is returned from the regenerator 3 to the absorber 1. In the main heat exchanger 7, the first phase whose absorbing performance is regenerated in the regenerator 3 is cooled, and the first phase that is separated in the liquid separator 2 is heated, so that the first phase that is flowed into the cooler 8 is cooled by the time at which the first phase is supplied to the cooler 8, and thus the energy for cooling in the cooler 8 can be reduced. In addition, the first phase that is supplied to the regenerator 3 is heated by the time at which the first phase is supplied to the regenerator 3, and thus the energy necessary for heating in the reboiler 5 can be reduced. As the main heat exchanger 7, an exchanger having a well-known configuration, such as a plate heat exchanger, can be used. It is preferable to use, as the main heat exchanger 7, a microchannel heat exchanger capable of heat exchange between fluids having a comparatively small difference in temperature. When a microchannel heat exchanger is used, the energy efficiency can be improved.

The cooler 8 is a part in which the absorption agent that is returned to the absorber 1 is cooled before the absorption agent is returned to the absorber 1. When the absorption agent is cooled by the cooler 8, the temperature of the absorption agent can be kept low in the absorber 1, so that the absorption efficiency of the acidic compound by the absorption agent can be improved. As the cooler 8, it is possible to use a heat exchanger or the like using inexpensive cooling water such as river water.

In the recovery apparatus described above, the absorption agent that is placed in the absorber 1 absorbs the acidic compound. Then, the absorption agent that has absorbed the acidic compound is separated into the first phase containing the acidic compound in a high content and the second phase containing the acidic compound in a low content in the liquid separator 2. The first phase that is separated in the liquid separator 2 is heated in the regenerator 3, so that the function of the absorption agent is recovered. The heating is performed using the reboiler 5. The heat from the reboiler 5 is caused to release the acidic compound absorbed in the absorption agent. The acidic compound that has been released here is recovered, so that the acidic compound contained in the mixed gas can be recovered. The first phase in which the absorption function of the absorption agent is recovered is returned to the absorber 1. According to the method for separation and recovery of an acidic compound of the present invention, it is not required to heat the second phase of the absorption agent using the reboiler 5, and thus the energy required for the reboiler 5 can be reduced as compared with the case in which the whole absorption agent is heated.

Other Embodiments

The constitutions of the present invention are not limited to the embodiments described above.

In the recovery apparatus described above, the case in which the liquid separator 2 is connected to the pipe L2 between the absorber 1 and the main heat exchanger 7 has been explained, but the position of the liquid separator 2 is not limited to the position described above, and the liquid separator 2 may be connected to, for example, the pipe L4 between the main heat exchanger 7 and the regenerator 3. In this case, in the main heat exchanger 7, the absorption liquid that has absorbed the acidic compound in the absorber 1 is subjected to heat exchange with the absorption liquid from which the acidic compound is eliminated in the regenerator 3, and then is separated into the first phase and the second phase in the liquid separator 2. Similar to the recovery apparatus in the embodiment described above, in this case, the first phase is supplied to the regenerator 3 and the second phase is refluxed to the absorber 1.

In the recovery apparatus described above, a heat recovery means may be further provided on the pipe L5 between the regenerator 3 and the main heat exchanger 7. When the heat recovered by the heat recovery means is supplied to the reboiler 5, the energy required for the reboiler 5 can be reduced.

Summary of Embodiments

The absorption agent of the embodiments described above contains water, an amine compound, and an organic solvent, and a value obtained by subtracting a solubility parameter of the organic solvent from a solubility parameter of the amine compound is 1.1 $(cal/cm^3)^{1/2}$ or more and 4.2 $(cal/cm^3)^{1/2}$ or less. The amine compound is preferably a secondary amine, more preferably an alkanolamine. The organic solvent is preferably either an alcohol having 2 to 15 carbon atoms or an ether having 4 to 20 carbon atoms, more preferably an alcohol in which hydrogen in a linear hydrocarbon having 3 to 8 carbon atoms is substituted with a hydroxyl group. It is preferable that the amine compound is contained in an amount of 20% by mass or more and 40% by mass or less.

It is preferable that the organic solvent is contained in an amount of 40% by mass or more and 60% by mass or less.

Examples

The present invention will be described in detailed by way of examples, but the present invention should not be interpreted to a limited extent based on the description of the examples.

An amine compound and an organic solvent were respectively selected from seven kinds of amine compounds shown in the left column in Table 1 below and three kinds of organic solvents shown in the upper column in Table 1, and the amine compound, the organic solvent and water were mixed in a mass ratio of 30:60:10 to experimentally produce 21 kinds in total of absorption agents.

The upper side of each column in Table 1 shows a value obtained by subtracting a solubility parameter of the organic solvent from a solubility parameter of the amine compound in each absorption liquid. A liquid phase of the absorption agent was observed before and after each of the absorption agents produced above absorbed carbon dioxide. The evaluation results thereof are shown at the lower side of each column in Table 1. In Table 1, "good" means that the absorption agent was a single liquid phase before the absorption agent absorbed carbon dioxide but the absorption agent was separated into two phases after the absorption agent absorbed carbon dioxide. In Table 1, "immiscible" means that the absorption agent was separated into two phases before and after the absorption agent absorbed carbon dioxide. In Table 1, "no separation" means that the absorption agent was a single liquid phase before and after the absorption agent absorbed carbon dioxide.

absorption agent absorbs the acidic compound is used, it is easy to bring the absorption agent into contact with the mixed gas, and thus it is possible to absorb the acidic compound contained in the mixed gas into the absorption agent. In addition, when the absorption agent that is phase-separated after the absorption agent absorbs the acidic compound is used, it is possible to recover the acidic compound by heating only the first phase containing the acidic compound in a high content, so that the acidic compound contained in the mixed gas can be recovered with less energy.

The present application is based on Japanese Patent Application No. 2015-249603, filed on Dec. 22, 2015, and the contents thereof are encompassed in the present application.

INDUSTRIAL APPLICABILITY

The absorption agent and method for separation and recovery of an acidic compound according to the present invention are used for, for example, removing an acidic compound from various mixed gases such as industrial exhaust gas, natural gas, and hydrogen gas, or for removing an acidic compound from mixed gas used for combustion, or the like, and in particular, preferably utilized for separating carbon dioxide from mixed gas.

The invention claimed is:
1. An absorption agent, comprising
water;
an amine compound; and
an organic solvent selected from the group consisting of 1-butanol, 1-pentanol and diethyleneglycol diethyl ether,

TABLE 1

DIFFERENCE IN SOLUBILITY PARAMETER/PHASE SEPARATION ABILITY

| | | SOLUBILITY PARAMETER [$(cal/cm^3)^{1/2}$] | ORGANIC SOLVENTS | | |
|---|---|---|---|---|---|
| | | | 1-BUTANOL 11.3 | 1-PENTANOL 11.0 | DIETHYLENEGLYCOL DIETHYL ETHER DEGDEE 8.2 |
| AMINE COMPOUNDS | 1,3-DIAMINOPROPANE DAP | 14.6 | 3.3 GOOD | 3.6 GOOD | 6.5 IMMISCIBLE |
| | 2-AMINOETHANOL MEA | 14.3 | 3.0 GOOD | 3.3 GOOD | 6.1 IMMISCIBLE |
| | DL-2-AMINO-1-PROPANOL AP | 13.3 | 2.0 GOOD | 2.3 GOOD | 5.1 IMMISCIBLE |
| | 2-(2-AMINOETHOXY)ETHANOL AEE | 12.7 | 1.4 GOOD | 1.7 GOOD | 4.5 IMMISCIBLE |
| | 2-(METHYLAMINO)ETHANOL (MAE) | 12.5 | 1.2 GOOD | 1.5 GOOD | 4.4 IMMISCIBLE |
| | 2-(ETHYLAMINO)ETHANOL EAE | 12.0 | 0.7 NO SEPARATION | 1.0 NO SEPARATION | 3.8 GOOD |
| | (R)-4-AMINO-2-METHYL-1-BUTANOL AMB | 8.8 | −2.5 NO SEPARATION | −2.2 NO SEPARATION | 0.6 NO SEPARATION |

From the results in Table 1, it was confirmed that when the combination of the amine compound and the organic solvent in the absorption agent is selected so that the value obtained by subtracting a solubility parameter of the organic solvent from a solubility parameter of the amine compound is 1.1 $(cal/cm^3)^{1/2}$ or more and 4.2 $(cal/cm^3)^{1/2}$ or less, the absorption agent is a single liquid phase before the absorption agent absorbs the acidic compound, and the absorption agent is phase-separated into two phases after the absorption agent absorbs the acidic compound. As described above, when the absorption agent that is not phase-separated before the wherein when the organic solvent is 1-butanol, the amine compound is 2-(2-aminoethoxy)ethanol or 2-(methylamino)ethanol, when the organic solvent is 1-pentanol, the amine compound is 2-aminoethanol, 2-(2-aminoethoxy)ethanol or 2-(methylamino)ethanol, when the organic solvent is diethyleneglycol diethyl ether, the amine compound is 2-(ethylamino)ethanol, and the absorption agent comprises 30% to 40% by mass of the amine compound and 40% to 60% by mass of the organic solvent such that the absorption agent absorbs an acidic compound and is phase-separated into a first phase containing the acidic compound in a high content and a second phase containing the acidic compound in a low content after the absorption agent absorbs the acidic compound.

2. A method of manufacturing an absorption agent, comprising:

mixing water, an amine compound, and an organic solvent, wherein the organic solvent is selected from the group consisting of 1-butanol, 1-pentanol and diethyleneglycol diethyl ether, when the organic solvent is 1-butanol, the amine compound is 2-(2-aminoethoxy)ethanol or 2-(methylamino)ethanol, when the organic solvent is 1-pentanol, the amine compound is 2-aminoethanol, 2-(2-aminoethoxy)ethanol or 2-(methylamino)ethanol, when the organic solvent is diethyleneglycol diethyl ether, the amine compound is 2-(ethylamino)ethanol, and the absorption agent comprises 30% to 40% by mass of the amine compound and 40% to 60% by mass of the organic solvent such that the absorption agent absorbs an acidic compound and is phase-separated into a first phase containing the acidic compound in a high content and a second phase containing the acidic compound in a low content after the absorption agent absorbs the acidic compound.

3. A method for separation and recovery of an acidic compound, comprising:

bringing a mixed gas comprising an acidic compound into contact with an absorption agent comprising water, an amine compound, and an organic solvent to absorb the acidic compound into the absorption agent;

causing the absorption agent that has absorbed the acidic compound to be phase-separated into a first phase and a second phase such that a content of the acidic compound in the first phase is higher than a content of the acidic compound in the second phase; and heating the first phase to release the acidic compound from the first phase, wherein the organic solvent is selected from the group consisting of 1-butanol, 1-pentanol and diethyleneglycol diethyl ether, when the organic solvent is 1-butanol, the amine compound is 2-(2 aminoethoxy)ethanol or 2-(methylamino)ethanol, when the organic solvent is 1-pentanol, the amine compound is 2-aminoethanol, 2-(2-aminoethoxy)ethanol or 2-(methylamino)ethanol, when the organic solvent is diethyleneglycol diethyl ether, the amine compound is 2-(ethylamino)ethanol, and the absorption agent comprises 30% to 40% by mass of the amine compound and 40% to 60% by mass of the organic solvent.

4. The absorption agent according to claim 1, wherein the amine compound is 2-(2-aminoethoxy)ethanol or 2-(methylamino)ethanol, and the organic solvent is 1-butanol or 1-pentanol.

5. The absorption agent according to claim 1, wherein the amine compound is 2-(ethylamino)ethanol, and the organic solvent is diethyleneglycol diethyl ether.

6. The absorption agent according to claim 1, wherein the amine compound is 2-aminoethanol, and the organic solvent is 1-pentanol.

7. The absorption agent according to claim 1, wherein the amine compound is 2-(2-aminoethoxy)ethanol, and the organic solvent is 1-butanol or 1-pentanol.

8. The absorption agent according to claim 1, wherein the amine compound is 2-(methylamino)ethanol, and the organic solvent is 1-butanol or 1-pentanol.

9. The absorption agent according to claim 1, wherein the amine compound is 2-(2-aminoethoxy)ethanol or 2-(methylamino)ethanol, and the organic solvent is 1-butanol.

10. The absorption agent according to claim 1, wherein the amine compound is 2-aminoethanol, 2-(2-aminoethoxy)ethanol or 2-(methylamino)ethanol, and the organic solvent is 1-pentanol.

11. The method of claim 2, wherein the amine compound is 2-aminoethanol, 2-(2-aminoethoxy)ethanol or 2-(methylamino)ethanol, and the organic solvent is 1-pentanol.

12. The method of claim 2, wherein the amine compound is 2-(ethylamino)ethanol, and the organic solvent is diethyleneglycol diethyl ether.

13. The method of claim 2, wherein the amine compound is 2-aminoethanol, and the organic solvent is 1-pentanol.

14. The method of claim 2, wherein the amine compound is 2-(2-aminoethoxy)ethanol, and the organic solvent is 1-butanol or 1-pentanol.

15. The method of claim 2, wherein the amine compound is 2-(methylamino)ethanol, and the organic solvent is 1-butanol or 1-pentanol.

16. The method of claim 3, wherein the amine compound is 2-(2 aminoethoxy)ethanol or 2-(methylamino)ethanol, and the organic solvent is 1-butanol or 1-pentanol.

17. The method of claim 3, wherein the amine compound is 2-(ethylamino)ethanol, and the organic solvent is diethyleneglycol diethyl ether.

18. The method of claim 3, wherein the amine compound is 2-aminoethanol, and the organic solvent is or 1-pentanol.

19. The method of claim 3, wherein the amine compound is 2-(2-aminoethoxy)ethanol, and the organic solvent is 1-butanol or 1-pentanol.

20. The method of claim 3, wherein the amine compound is 2-(methylamino)ethanol, and the organic solvent is 1-butanol or 1-pentanol.

* * * * *